United States Patent
Murayama et al.

(10) Patent No.: US 8,976,385 B2
(45) Date of Patent: Mar. 10, 2015

(54) PRINT CONTROL APPARATUS, PRINT CONTROL METHOD, AND RECORDING MEDIUM FOR ARRANGING PRINT ELEMENTS TO BE PRINTED OVER AN AREA OF A PRINT MEDIUM

(75) Inventors: Michihei Murayama, Tachikawa (JP); Kiyoshi Katano, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 847 days.

(21) Appl. No.: 12/607,004

(22) Filed: Oct. 27, 2009

(65) Prior Publication Data

US 2010/0103460 A1   Apr. 29, 2010

(30) Foreign Application Priority Data

Oct. 28, 2008   (JP) ................. 2008-276980

(51) Int. Cl.
*G06F 3/12* (2006.01)

(52) U.S. Cl.
CPC ............ *G06F 3/1205* (2013.01); *G06F 3/1208* (2013.01); *G06F 3/1242* (2013.01); *G06F 3/1246* (2013.01); *G06F 3/1284* (2013.01); *G06F 3/125* (2013.01); *G06F 3/1285* (2013.01)
USPC ........... 358/1.15; 358/1.9; 358/2.1; 358/3.23; 358/1.18

(58) Field of Classification Search
USPC .................................................. 358/1.1–3.23
See application file for complete search history.

(56) References Cited

U.S. PATENT DOCUMENTS

| | | | |
|---|---|---|---|
| 2003/0007186 A1* | 1/2003 | Suino et al. | 358/3.15 |
| 2005/0174600 A1* | 8/2005 | Kitahara et al. | 358/1.15 |
| 2005/0225779 A1* | 10/2005 | Kubota | 358/1.2 |
| 2008/0291497 A1* | 11/2008 | Kuwano et al. | 358/1.18 |
| 2009/0086218 A1* | 4/2009 | Iwauchi | 358/1.2 |
| 2009/0185209 A1* | 7/2009 | Yudasaka et al. | 358/1.9 |

FOREIGN PATENT DOCUMENTS

| | | | |
|---|---|---|---|
| JP | 2003-296069 A | 10/2003 | |
| JP | 2006-272803 A | 10/2006 | |

* cited by examiner

*Primary Examiner* — Marcellus Augustin
(74) *Attorney, Agent, or Firm* — Canon USA Inc. IP Division

(57) ABSTRACT

A printing apparatus is caused to print an image in which elements included in a document are arranged on a page by a print control method. The document, which includes the elements and information for arranging the elements, is acquired. An element disposed on an edge of the page is detected from among the elements included in the acquired document. The printing apparatus is caused to print an image in which the elements included in the document are arranged on the page and in which the element disposed on the edge of the page is expanded to a predetermined output area.

14 Claims, 16 Drawing Sheets

FIG. 2

```
<?xml version="1.0" encoding="Shift_JIS"?>
<!DOCTYPE html PUBLIC"-//W3C//DTD XHTML-Print 1.0//EN"
    "http://www.w3.org/MarkUp/DTD/xhtml-print10.dtd">
<html xmlns="http://www.w3.org/1999/xhtml" xml:lang="ja">

<head>
<title>title of the document</title>
<!-- link rel="stylesheet" href="styles.css" type="text/css" / -->
<style type="text/css">
@media print{
    @page {
        size:210mm297mm;
        margin:0;
    }
}
body {
    margin:0;
    padding:0;
    background-image:url("bg.jpg");
}
div.blue{
    background-color:blue;
}
p.frame{
    border.1pt solid red;
}
</style>
</head>

<body>
    <div class="blue">
        <p class="frame">content of this paragraph</p>
    </div>
</body>

</html>
```

PRINT CONTROL APPARATUS, PRINT CONTROL METHOD, AND RECORDING MEDIUM FOR ARRANGING PRINT ELEMENTS TO BE PRINTED OVER AN AREA OF A PRINT MEDIUM

BACKGROUND OF THE INVENTION

1. Field of the Invention

The present invention relates to a print control method for causing a printing apparatus to print an image in which elements included in a document are arranged on a page.

2. Description of the Related Art

In a process of printing data described in a page description language or a markup language, such as a hypertext markup language (HTML), elements may be arranged over the entire output area by setting an amount of margin to 0. Thus, so-called marginless printing can be performed in which no margin is provided at the edges of a sheet on which an image is printed.

However, even when the amount of margin of a page is set to 0 and elements are arranged on the edges of the page, there is a possibility that edges of the sheet cannot be printed on due to errors in a printing mechanism. In such a case, white streaks remain at the edges of the sheet and satisfactory print results cannot be obtained.

Various methods for avoiding such an unsatisfactory print result have been proposed. For example, Japanese Patent Laid-Open No. 2003-296069 describes a method in which, in a marginless printing process, an expanded image is generated on the basis of image information obtained from an original image and is added to the original image at a peripheral area thereof. In this case, the printing process is performed on the basis of an image that is larger than the original image. Therefore, even if there are errors in the printing mechanism, the possibility that the edges of the sheet cannot be printed on can be eliminated.

However, if the entire area of an output image of a single page is subjected to an expansion process, such as an enlarging process, as in the above-described method of the related art, there is a risk that the following problems will occur in the output result. That is, in the case where, for example, six photographs are arranged as shown in FIG. 15A, the following problems occur. If the entire area of the page shown in FIG. 15A is expanded, an output image shown in FIG. 15B is obtained. However, when the thus-obtained output image is printed, the areas of the photographs printed on the page differ from each other.

In, for example, an XHTML-Print document, elements are not always arranged on the edges of the output area even when the amount of margin of the page is set to 0. In such a case, no white streak appears at the edges of the sheet even when the printing process is performed without expanding the output image. Therefore, the output image will be unnecessarily expanded.

Japanese Patent Laid-Open No. 2006-272803 describes a method in which an expanding method is applied in consideration of objects placed in a peripheral area instead of expanding the entire area of the image for which the marginless printing process is performed. More specifically, if clear objects are placed in the peripheral area, the image is expanded by enlarging the image to prevent deformation of the shapes of the objects. If there are no clear objects in the peripheral area or if the objects in the peripheral area are unclear, the image is expanded by generating new image data in an area outside the image on the basis of the image data of the peripheral area.

However, only the objects placed in the peripheral area are taken into consideration in the process of detecting the objects and expanding the image. Therefore, there is a risk that an unnatural image will be printed if the entire area of the expanded image is printed.

SUMMARY OF THE INVENTION

The present invention provides a print control method with which marginless printing for printing an image in which elements included in a document are arranged can be reliably performed without leaving margins or generating expanded areas that are conspicuous.

An embodiment of the present invention provides a print control method for causing a printing apparatus to print an image in which elements included in a document are arranged on a page. The print control method includes an acquiring step of acquiring the document, the document including the elements and information for arranging the elements; a detecting step of detecting an element disposed on an edge of the page from among the elements included in the document acquired in the acquiring step on the basis of the information for arranging the element; and a print control step of causing the printing apparatus to print an image in which the elements included in the document are arranged on the page and in which the element disposed on the edge of the page is expanded to a predetermined output area.

Further features of the present invention will become apparent from the following description of exemplary embodiments with reference to the attached drawings.

BRIEF DESCRIPTION OF THE DRAWINGS

FIG. 2 is a diagram illustrating an example of an XHTML-Print document.

DESCRIPTION OF THE EMBODIMENTS

Embodiments of the present invention will now be described in detail with reference to the accompanying drawings.

Figure 1:
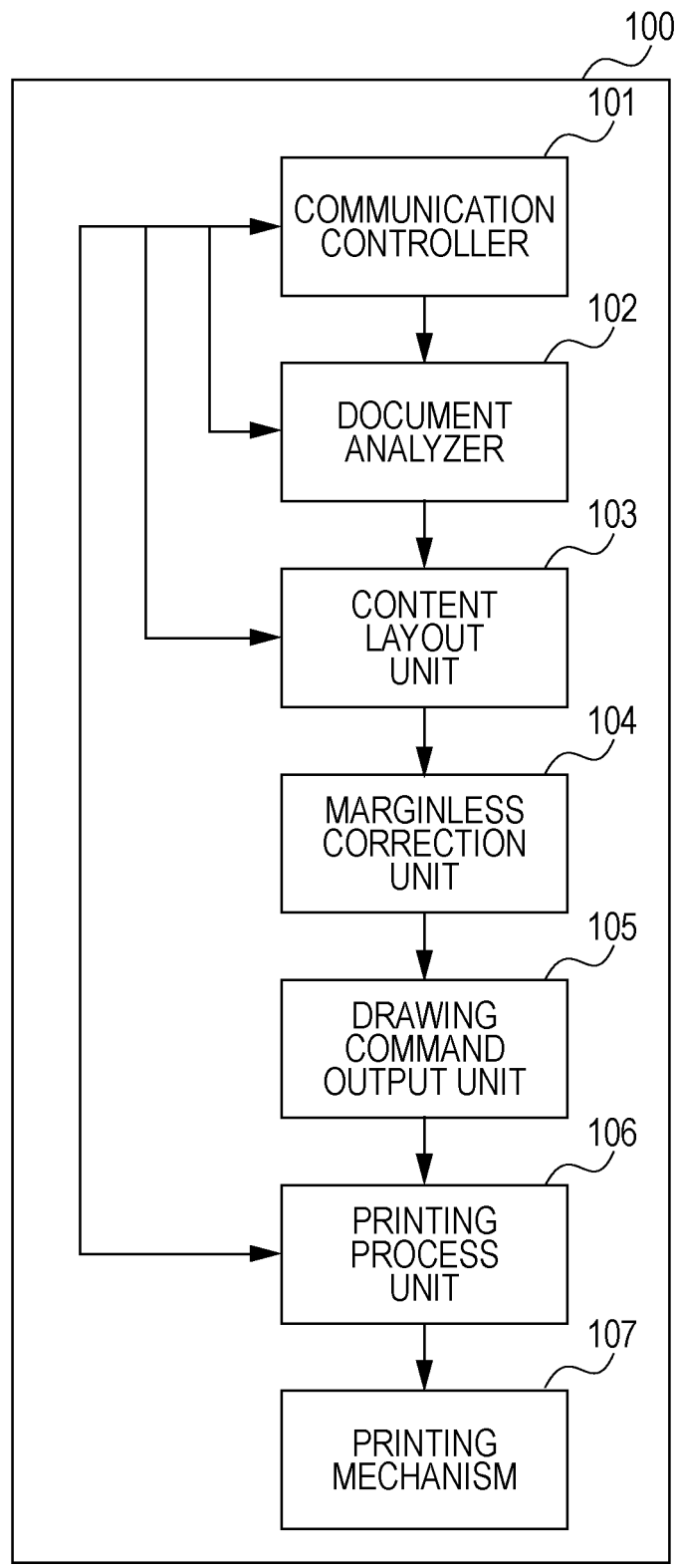
FIG. 1 is a diagram illustrating the structure of a printing apparatus according to an embodiment.

FIG. 1 is a diagram illustrating the structure of a printing apparatus 100 according to an embodiment. In FIG. 1, the printing apparatus 100 is capable of directly receiving content data and performing a process of printing the content data. The content data is not particularly limited as long as the content data represents a page description language document that can be interpreted by the printing apparatus 100. For example, XHTML-Print documents, PDF documents, SVG documents, etc., may be used. In this embodiment, XHTML-Print documents will be explained. It is assumed that the specifications of the documents comply with the corresponding standards, and detailed explanations thereof will be omitted here.

The printing apparatus 100 includes a communication controller 101, a document analyzer 102, a content layout unit 103, a marginless correction unit 104, a drawing command output unit 105, a printing process unit 106, and a printing mechanism 107.

The communication controller 101 is an interface which complies with standards such as the Ethernet® standards. The communication controller 101 controls communications with external apparatuses through a network. The document analyzer 102 analyzes a page description language document received by the communication controller 101. In this embodiment, it is assumed that an XHTML-Print document is received.

The content layout unit 103 arranges element objects included in the received document on the basis of the analysis result obtained by the document analyzer 102 in accordance with print output settings. The marginless correction unit 104 determines whether or not marginless printing is necessary on the basis of the result of the arrangement performed by the content layout unit 103. If marginless printing is necessary, the arrangement result is corrected to an arrangement suitable for the marginless printing as necessary. The drawing command output unit 105 outputs a drawing command for the printing process on the basis of the arrangement result obtained by the content layout unit 103 and corrected by the marginless correction unit 104. The printing process unit 106 generates a print output image on the basis of the drawing command output from the drawing command output unit 105, and outputs a print instruction to the printing mechanism 107 to perform print control. The printing mechanism 107 performs a process of printing the print output image generated by the printing process unit 106 on a recording medium under the control of the printing process unit 106.

According to the above-described explanation, the content layout unit 103 arranges the elements and the marginless correction unit 104 corrects the arrangement result obtained by the content layout unit 103. However, the process of arranging the elements is not limited to this. For example, the determination of whether or not marginless printing is necessary may be determined first on the basis of the analysis result obtained by the document analyzer 102, and then the arrangement of the elements may be set to an arrangement suitable for the marginless printing if necessary. Thus, the order of steps in the process of arranging the elements is not particularly limited.

The units 101 to 106 shown in FIG. 1 are provided by a control section of a CPU (not shown) or the like. More specifically, programs for executing the control processes of the units 101 to 106 are stored in a nonvolatile storage medium, such as a ROM, and are read out and stored in a memory, such as a RAM, to be executed. The processes shown in the flowcharts which will be described below are also provided by causing the CPU to execute the corresponding programs.

FIG. 2 is a diagram illustrating an example of an XHTML-Print document. In this example, the document includes an XML header, a DOCTYPE declaration, and an HTML element. The HTML element includes a header <head> and a body <body>. The HTML header includes a title <title> and a style sheet <style>. The style sheet defines the style, that is, the color, size, etc., of each element. The HTML body is a substantial portion of the document, and substantial contents of the document are described in the HTML body. The XHTML-Print document complies with the corresponding standards, and detailed explanations thereof will be omitted here.

Figure 3:
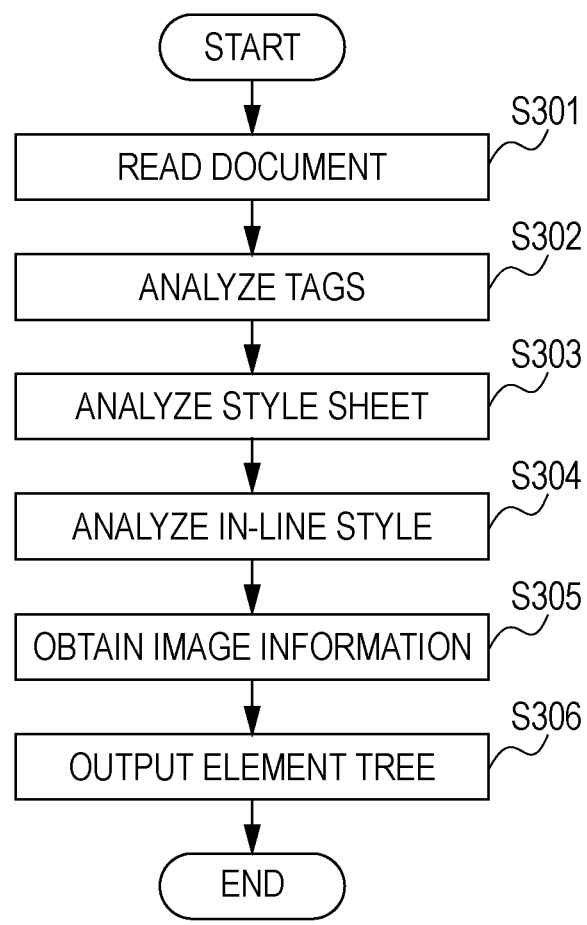
FIG. 3 is a flowchart of a process performed by a document analyzer.

FIG. 3 is a flowchart of a process performed by the document analyzer 102. First, in step S301, an XHTML-Print document received by the communication controller 101 is extracted. In step S302, tags included in the extracted document are analyzed. In step S303, the style sheet is analyzed and the style is applied to the tags analyzed in step S302. In step S304, the stile determined by the in-line designation of the XHTML-Print document is analyzed, and the analysis result is applied to the tags. Due to the in-line designation, a style which is to be applied to only a certain portion of a text can be designated.

Next, in step S305, the image information is obtained. Then, in step S306, an element tree obtained as the final analysis result is output as an output of the document analyzer 102. The element tree stores a tree structure of the elements, a style attribute (margin, border, padding, etc.) of each element, and the content of each element.

Figure 4:
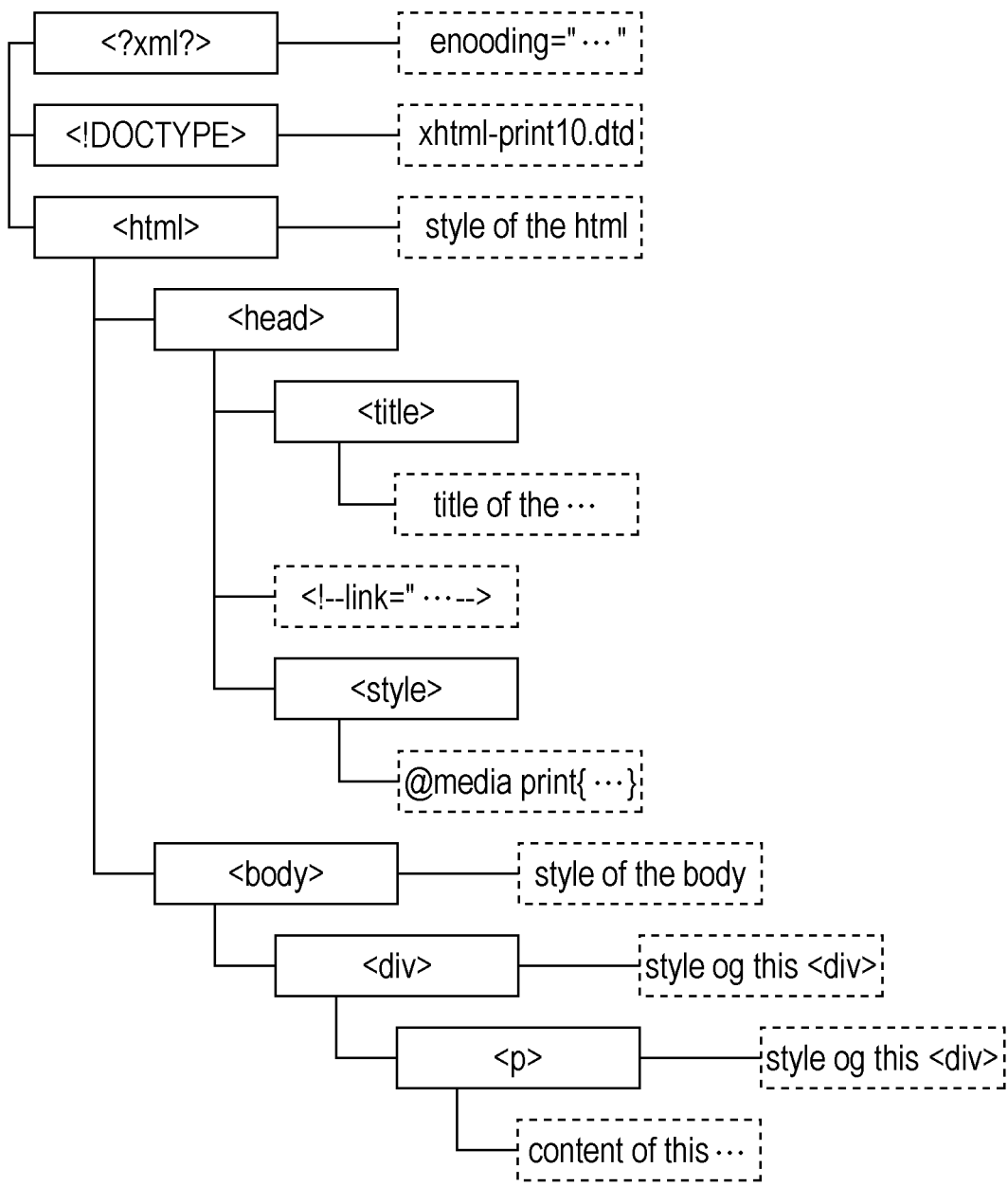
FIG. 4 is a diagram illustrating an example of an element tree output by the document analyzer.

FIG. 4 is a diagram illustrating an example of an element tree output by the document analyzer 102. The three structure shown in FIG. 4 is obtained as a result of analysis of the XHTML-Print document shown in FIG. 2.

Figure 5:
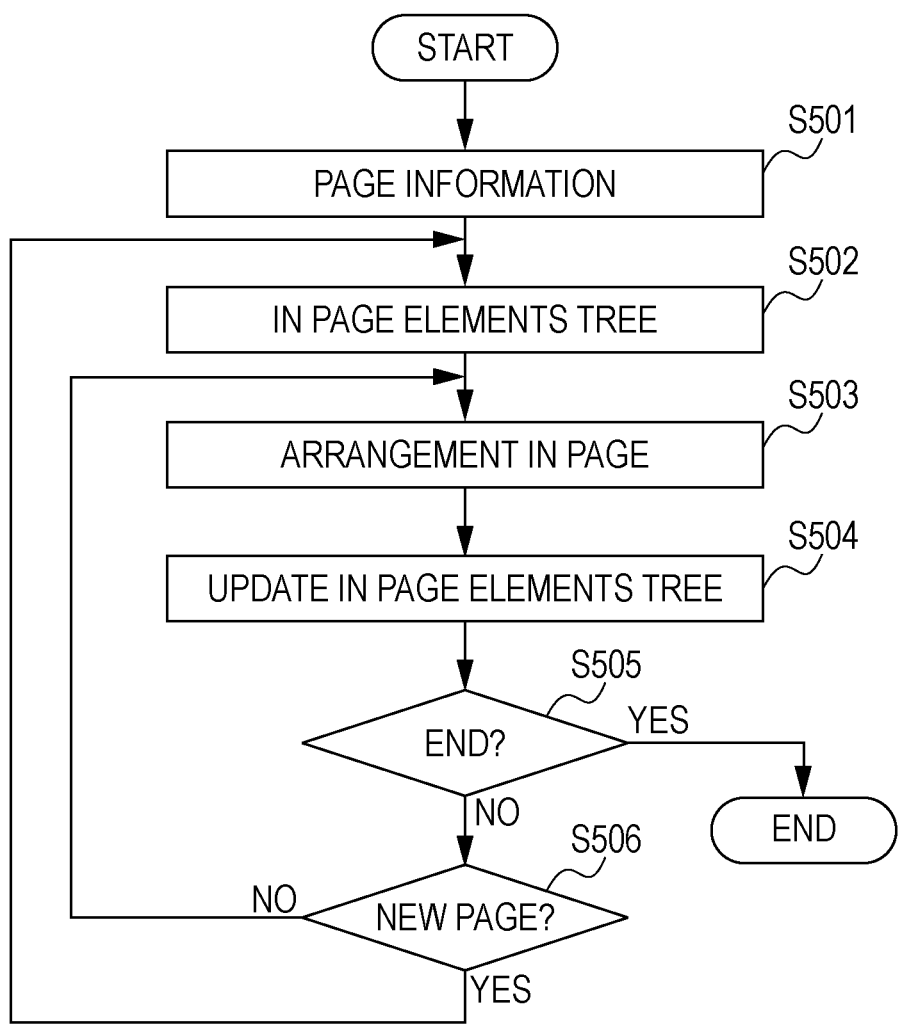
FIG. 5 is a flowchart of a process performed by a content layout unit.

FIG. 5 is a flowchart of a process performed by the content layout unit 103. The content layout unit 103 performs a process of referring to the element tree obtained as the analysis result from the document analyzer 102 and successively arranging the elements included in the element tree on a page. Thus, an in-page element tree is obtained. The above-described element tree corresponds to the entire body of the XHTML-Print document, whereas the in-page element tree is generated individually for each page.

First, in step S501, page information is analyzed and a page information list is created. The page information shows the shape of a page, and includes a page size, a page margin, etc., described in @page{ . . . } in the style sheet. The page area of each page is determined on the basis of the above-described information, and is stored as a list. Next, in step S502, a process of forming in-page element trees is started. Each of the in-page element trees is a partial tree structure which corresponds to a single page in the entire element tree. In the present embodiment, the elements to be arranged on each page are managed by the in-page element tree.

In step S503, the elements included in the element tree are arranged on a page. In this example, the elements are sequentially extracted from the above-described element tree, and the positions where the elements are to be disposed are determined by determining the coordinates, the width, and the height of each element in accordance with the style analyzed by the document analyzer 102.

In step S504, the in-page element tree is updated on the basis of the result of the arrangement performed in step S503. More specifically, when the arrangement of a certain element in the page is determined, the element is added to the in-page element tree in association with the arrangement information (coordinates, width, and height) thereof. Thus, the in-page element tree is updated. Then, in step S505, it is determined whether or not the arrangement of all of the elements included in the element tree is finished. If the arrangement is finished, the process ends.

In step S506, whether or not to start a new page is determined. If it is not necessary to start a new page, the process returns to step S503 and the next element is processed. If it is necessary to start a new page, the process returns to step S502 and an in-page element tree for a new page is created.

In the process described with reference to FIG. 5, the page size and margin are described in the received XHTML-Print document, and the layout is determined on the basis of the thus-obtained page size and margin. However, the present invention is not limited to this, and the layout may also be determined on the basis of the page size and margin designated by instructions input by a user. For example, page sizes may be stored in association with sheet types in advance, and the layout may be determined in accordance with the sheet type and margin designated by the user. In such a case, the margin may be set to 0 when marginless printing is set by the user. When, for example, a print mode in which a plurality of pages are printed on a single print sheet, as in so-called 2-in-1 printing, the layout is determined in consideration of the print mode. In addition, the page size and margin may be set in advance, and the layout may be determined on the basis of the preset page size and margin if no instructions are input by the user. The instructions from the user may be input by operating an operating unit (not shown), such as keys.

In the case where the page size and margin are obtained without referring to the document, it is not necessary that the document to be printed be a page description language document as long as a print page is generated by arranging elements in accordance with the designated page size. For example, a document described in a normal markup language, such as HTML, may be used. In such a case, the attribute of the element is determined by detecting the element.

Figure 6:
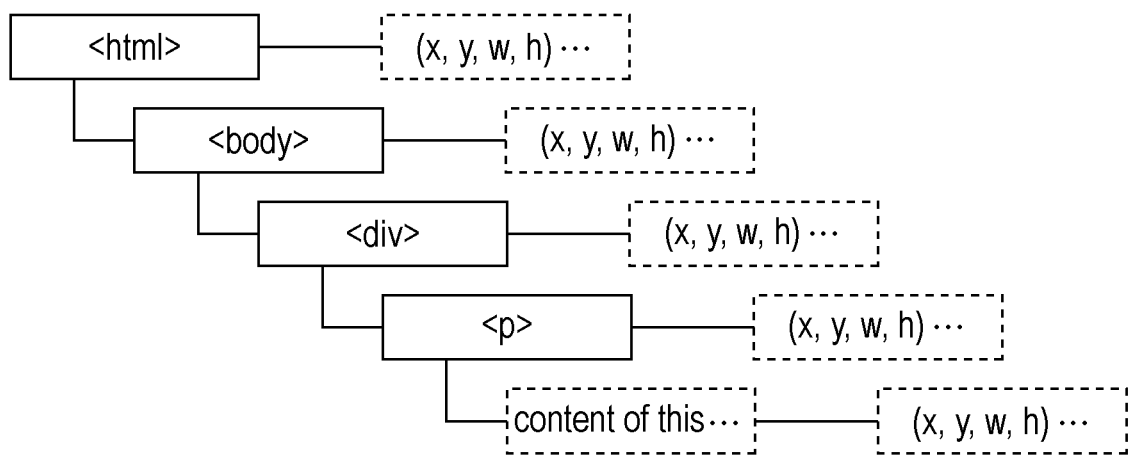
FIG. 6 is a diagram illustrating an example of an in-page element tree output by the content layout unit.

FIG. 6 is a diagram illustrating an example of an in-page element tree output by the content layout unit 103. In this example, it is assumed that the element tree shown in FIG. 4 corresponds to an output of a single page and the corresponding in-page element tree is obtained as show in FIG. 6.

Figure 7:
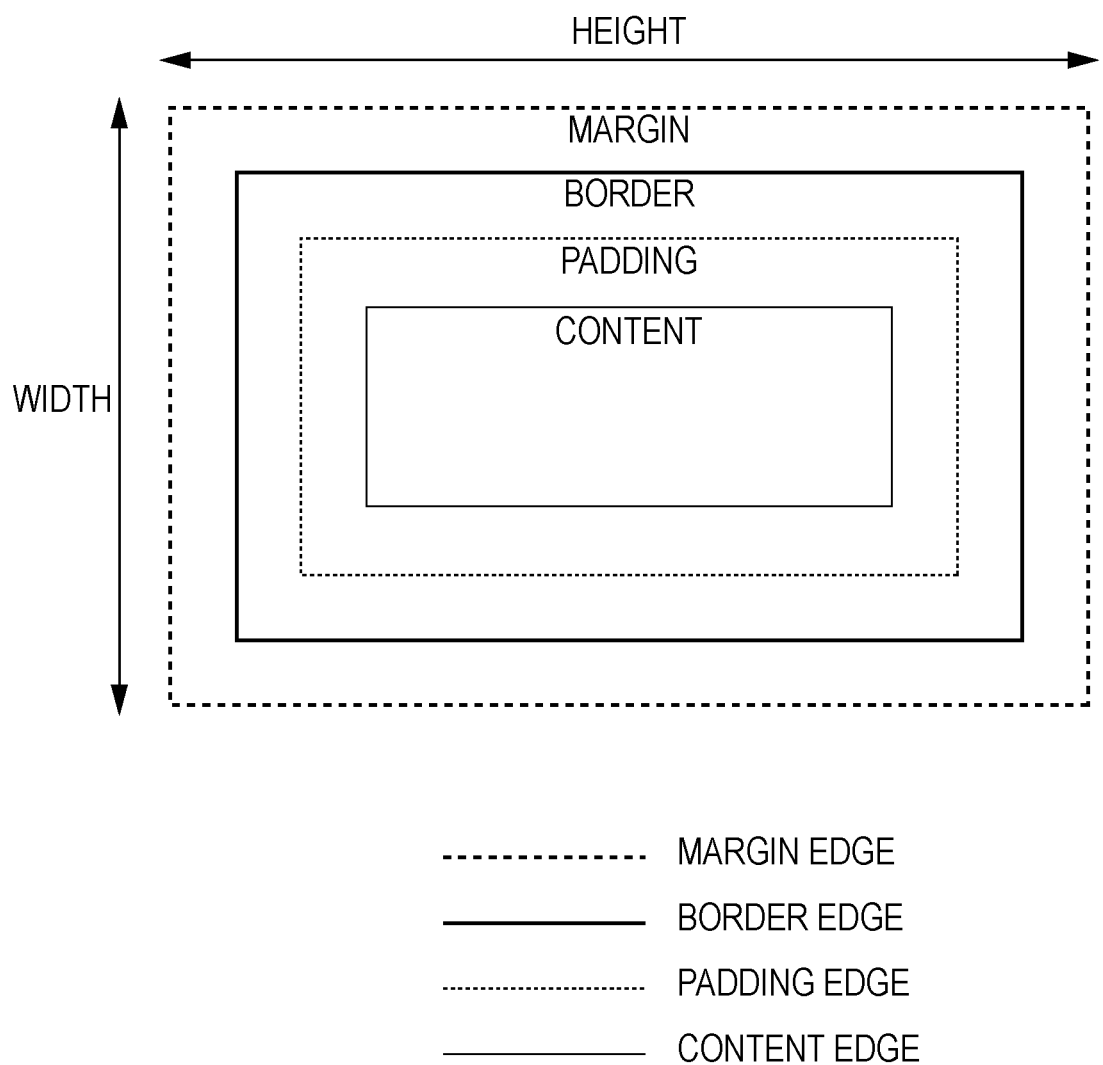
FIG. 7 is a diagram illustrating a BOX model of cascading style sheets (CSS).

FIG. 7 is a diagram illustrating a BOX model of a cascading style sheet (CSS). The BOX model of the CSS shows an area occupied by each element, and a basic arrangement of the element can be determined by the BOX model of the CSS. As a result of the document analysis, the position, width, and height of each box element included in the XHTML-Print document can be determined.

Referring to FIG. 7, a margin area between a margin edge and a border edge is a transparent blank space for which a background color cannot be set. Therefore, no image is printed in this area. The area surrounded by the border edge is the area in which an image is actually printed. In the case where the margin area is provided, even if an element is disposed on an edge of the image data, an area in which no image is printed is provided between the area in which an image is actually printed and the edge of the page area. Therefore, the substantial portion of the element does not contact the edge of the sheet.

The border area shown in FIG. 7 extends along the outer boundary of the element. Borders in various colors and thicknesses can be placed in the border area. The padding area shown in FIG. 7 shows an inner blank area. Unlike the transparent margin area for which no background color can be set, background colors can be set for the padding area. The content area is an area of a content, such as text, of the element.

Figure 8:
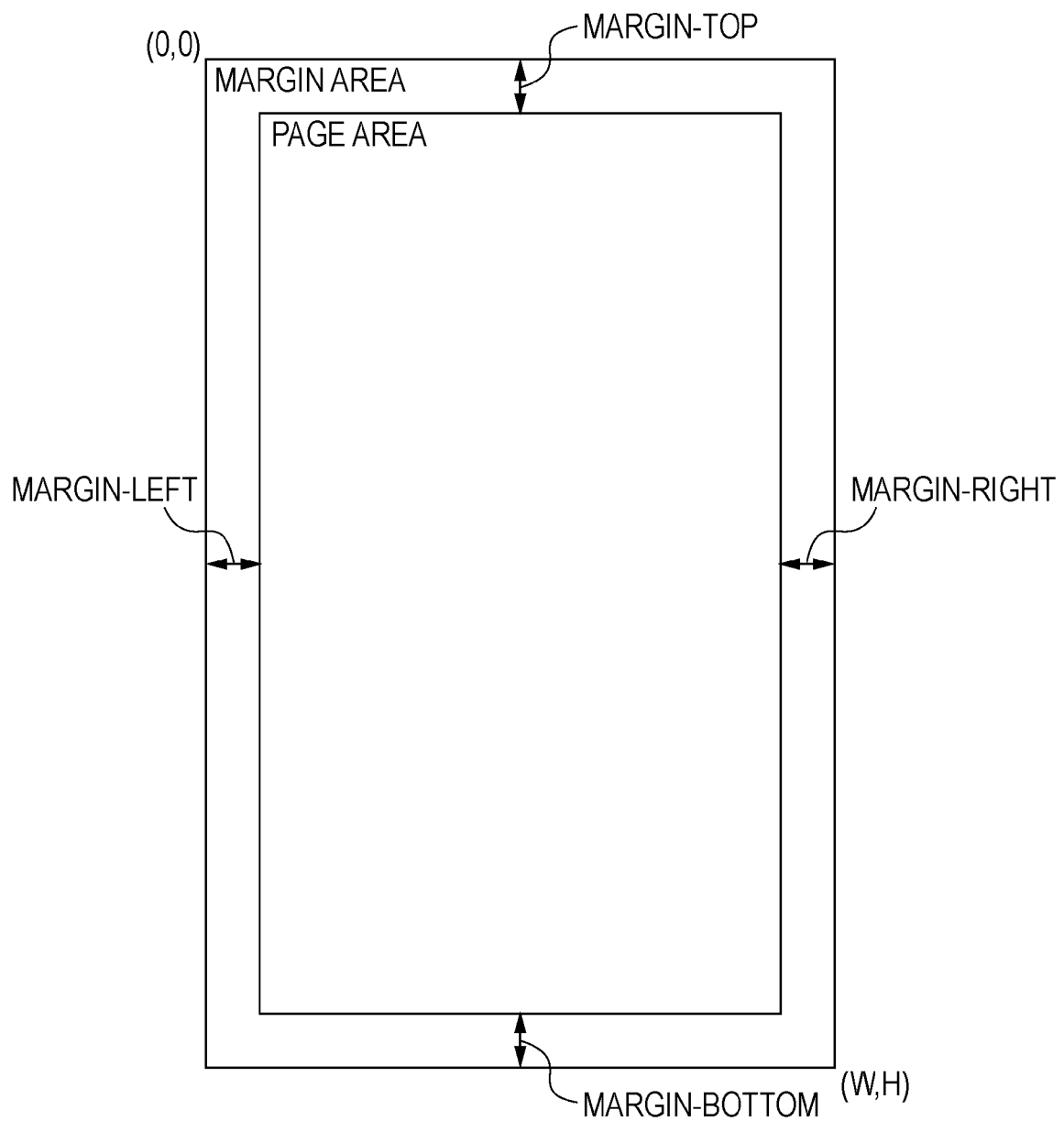
FIG. 8 is a diagram illustrating areas of a page on which elements are arranged.

FIG. 8 is a diagram illustrating a margin area and a page area of a page on which elements are arranged. The size described in @page{ . . . } in the style sheet corresponds to a sheet size. When margins (top, right, bottom, and left margins) are 0, the elements can be arranged in the entire area of the sheet size. Here, a coordinate system is set to manage the positions of the elements. The top left corner of the sheet is defined as an origin (0, 0). The values of the coordinates showing the positions, the widths, and the heights of the elements have predetermined units. The units may be arbitrarily set to, for example, millimeter, inch, point, or the like.

Figure 9:
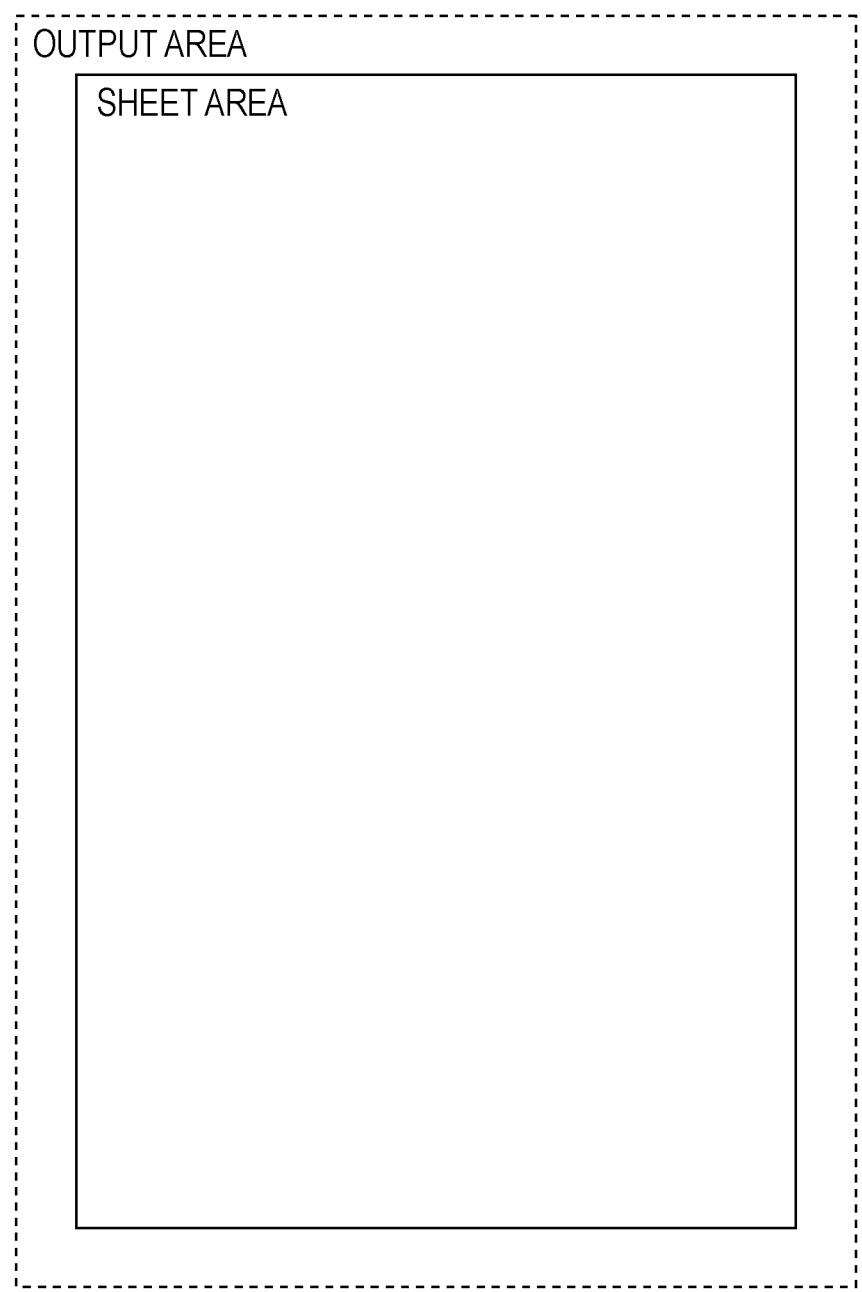
FIG. 9 is a diagram illustrating an output area set in marginless printing.

FIG. 9 is a diagram illustrating an output area in marginless printing. As described above, marginless printing can be performed by setting the margin to 0 and arranging the elements over the entire area of the sheet. However, in practice, there is a risk that an area (white streak) in which no image is printed will be generated at an edge of the sheet due to errors in the printing mechanism. To prevent this, as shown in FIG. 9, the output area is expanded beyond the sheet size.

Figure 10A:
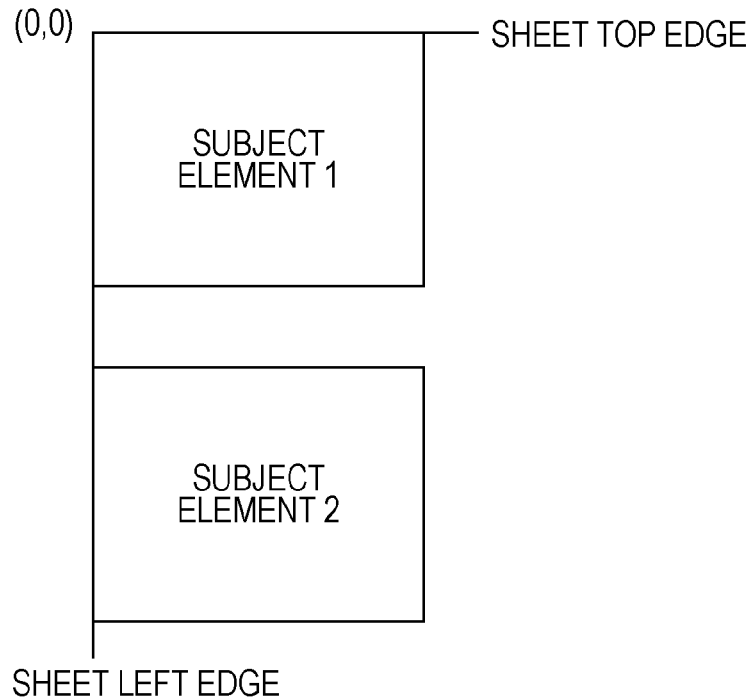
FIG. 10A is a diagram illustrating examples of elements arranged on an edge of an area corresponding to a certain sheet size.
Figure 10B:
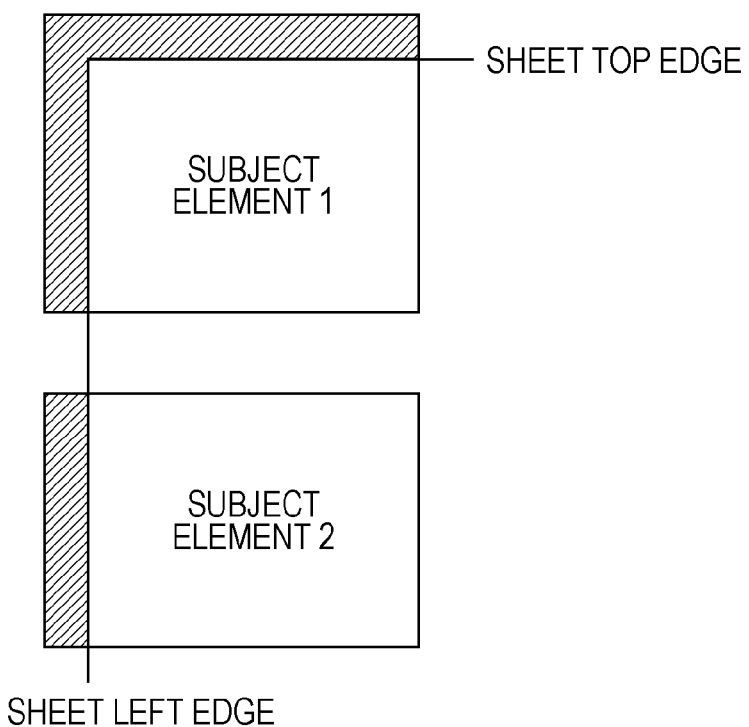
FIG. 10B is a diagram illustrating an example of an output area of the elements arranged on the edge of the area corresponding to the sheet size.

Based on the above-described explanations, a method for expanding the elements disposed on the edge of the page area will now be described. FIG. 10A is a diagram illustrating examples of elements arranged in an area corresponding to a certain sheet size. A subject element 1 is disposed at the top left corner of a sheet, and a subject element 2 is disposed on the left edge of the sheet. FIG. 10B is a diagram illustrating an example of an output area of the elements arranged on the edge of the page area. To output the subject elements shown in FIG. 10A in the output area shown in FIG. 9, the subject elements are expanded to the output area as shown in FIG. 10B. In the following explanation of a method for expanding the subject elements to the output area in accordance with the attributes of the elements, a subject element arranged at the top left corner will be described as an example. However, the method is similarly applicable to the elements on other edges.

Figure 11A:
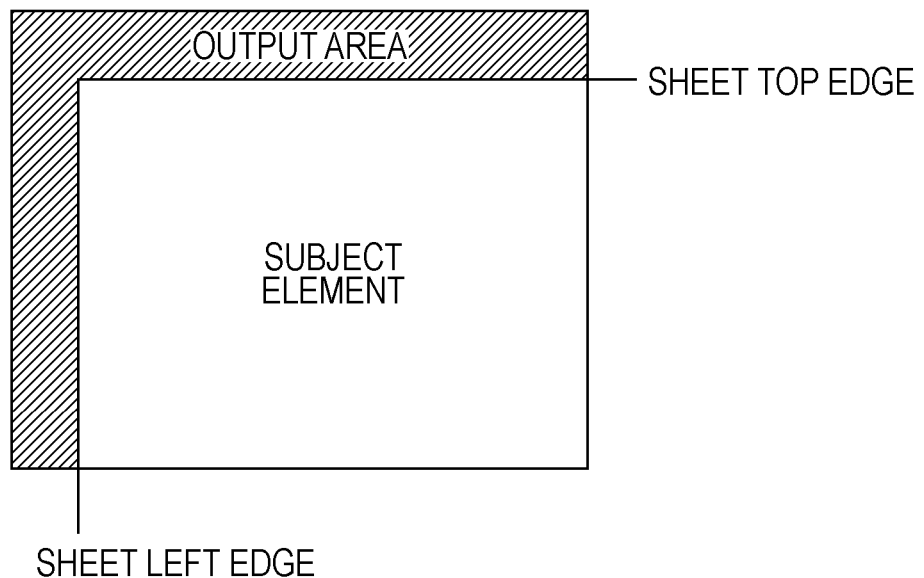
FIG. 11A is a diagram illustrating an example of an element having a border on an edge of a sheet.

FIG. 11A is a diagram illustrating an example of an element having a border on an edge of the page area. As described above, the border extends along the outer boundary of the element, and the thickness and color of the border can be designated in the XHTML-Print document shown in FIG. 2.

Figure 11B:
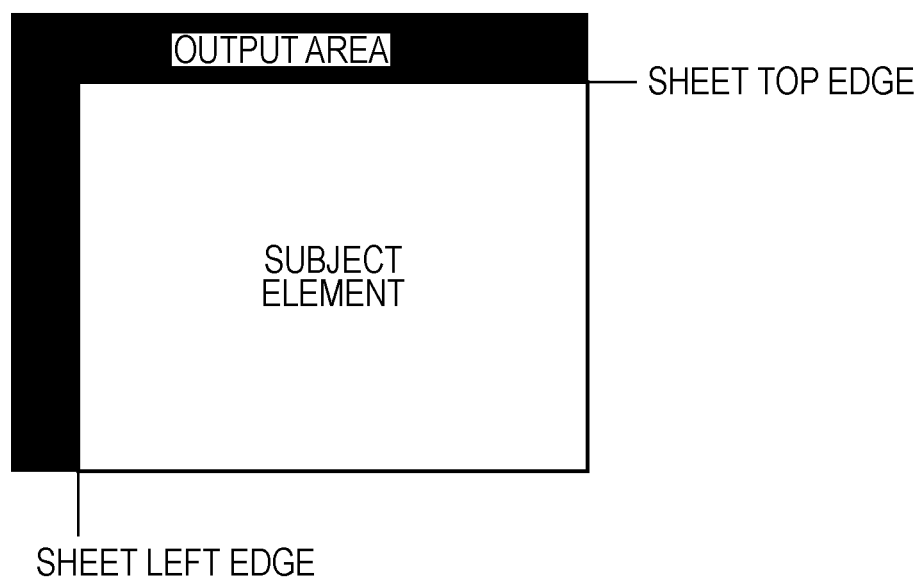
FIG. 11B is a diagram illustrating an example of the manner in which the element having the border on the edge of the sheet is expanded to the output area.

FIG. 11B is a diagram illustrating an example of the manner in which the element having the border is expanded to the output area. In FIG. 11B, the expansion process is performed by filling the output area of the image data with pixels of the border of the element. For example, the subject element to be expanded shown in FIG. 11A has a black border. In FIG. 11B, the output area is filled with the pixels of the border of the subject element, that is, the pixels forming the black border. This process is hereinafter referred to as "border marginless process".

If the above-described expansion process is performed for an element having a border, the thickness of the border simply varies if there are errors in the printing mechanism. Therefore, formation of white streaks at the edges of the sheet can be prevented without forming unnatural images. In addition, since the position of the content of the element is not changed, the relative positional relationship between the elements in the page can be maintained.

Figure 12A:
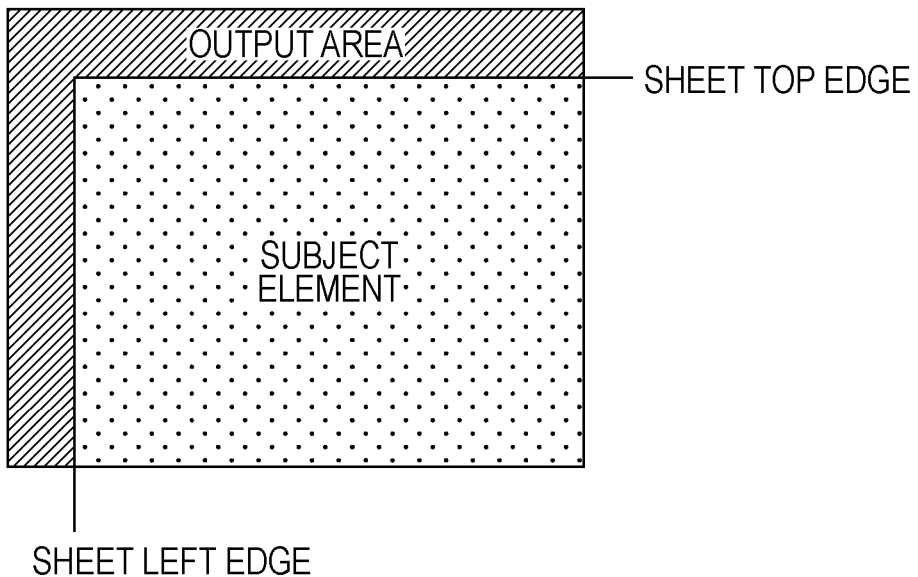
FIG. 12A is a diagram illustrating an example of an element having a background color on an edge of a sheet.
Figure 12B:
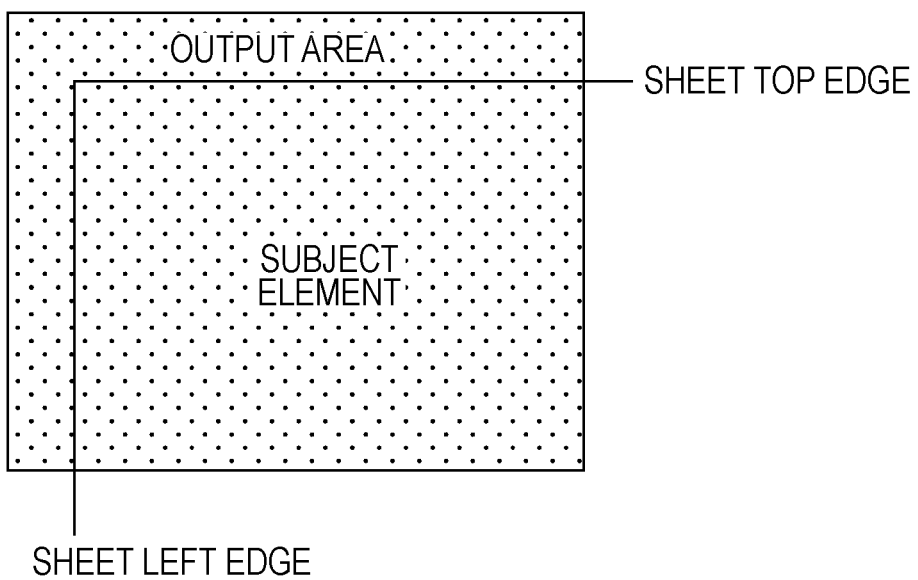
FIG. 12B is a diagram illustrating an example of the manner in which the element having the background color on the edge of the sheet is expanded to the output area.

FIG. 12A is a diagram illustrating an example of an element having a background color on an edge of the sheet. As shown in FIG. 2, the background color can be designated in the XHTML-Print document, and the color of the background is set to the color designated in the XHTML-Print document. If the element has no border, the padding area, that is, a colored background, is at an edge of the element. In this example, it is assumed that the element is at an edge of the image data of the sheet size. Therefore, the padding area of the element is at the edge of the image data to be printed. Therefore, similar to the above-described "border marginless process", if the background color is designated, the output area may be filled with pixels of the designated color. FIG. 12B is a diagram illustrating an example of the manner in which the element having the background color on the edge of the sheet is expanded to the output area.

Figure 13A:
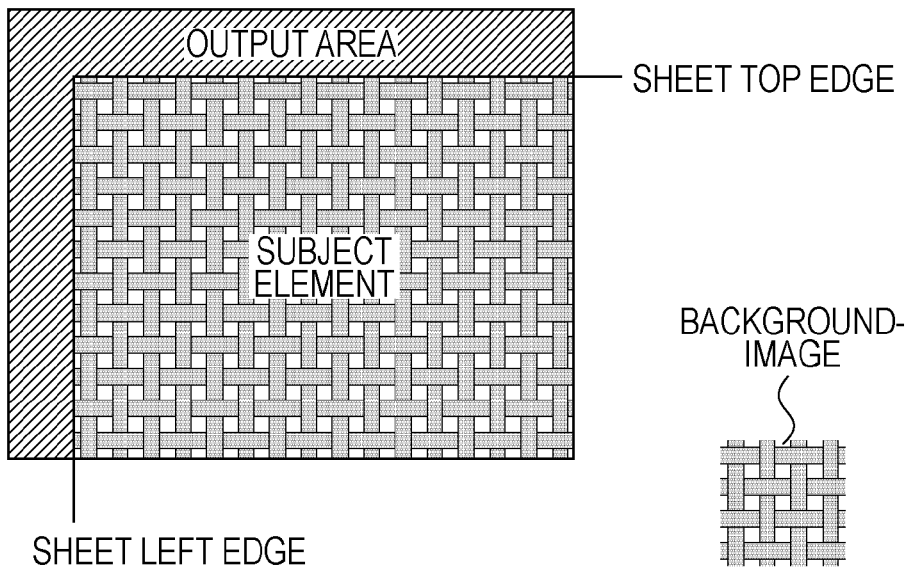
FIG. 13A is a diagram illustrating an example of an element having a background image (repeat) on an edge of a sheet.
Figure 13B:
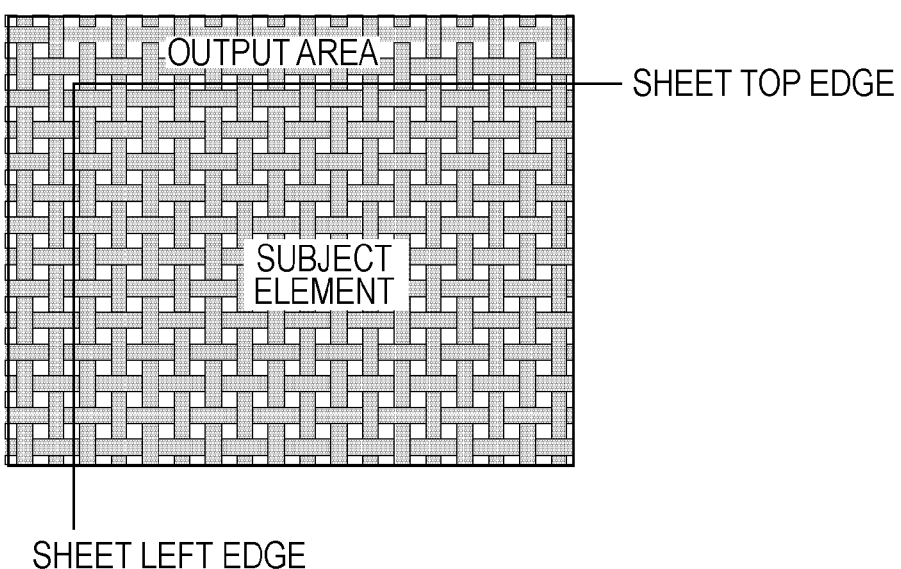
FIG. 13B is a diagram illustrating an example of the manner in which the element having the background image (repeat) on the edge of the sheet is expanded to the output area.

FIG. 13A is a diagram illustrating an example of an element having a background image (repeat) on an edge of a sheet. The background image (repeat) can be designated in the XHTML-Print document. When a background image (repeat) is designated, a repeat pattern as shown in FIG. 13A, for example, is used as the background of the element. In the case where the element having the background image is to be expanded, the repeat pattern of the background image can be extended to the output area. FIG. 13B is a diagram illustrating an example of the manner in which the element having the background image (repeat) on the edge of the sheet is expanded to the output area.

The above-described marginless processes for the elements having the background color or the background image are hereinafter referred to as "background marginless process". If the above-described expansion process is performed for an element having a background, the area of the padding area, which shows the background, simply varies if there are errors in the printing mechanism. Therefore, formation of white streaks at the edges of the sheet can be prevented without forming unnatural images. In addition, since the position of the content of the element is not changed, the relative positional relationship between the elements in the page can be maintained.

In addition, in the above-described marginless processes, portions to be originally printed are not expanded to the outside of the sheet size. Therefore, a print defect that a portion of an element cannot be printed can be prevented.

Figure 14A:
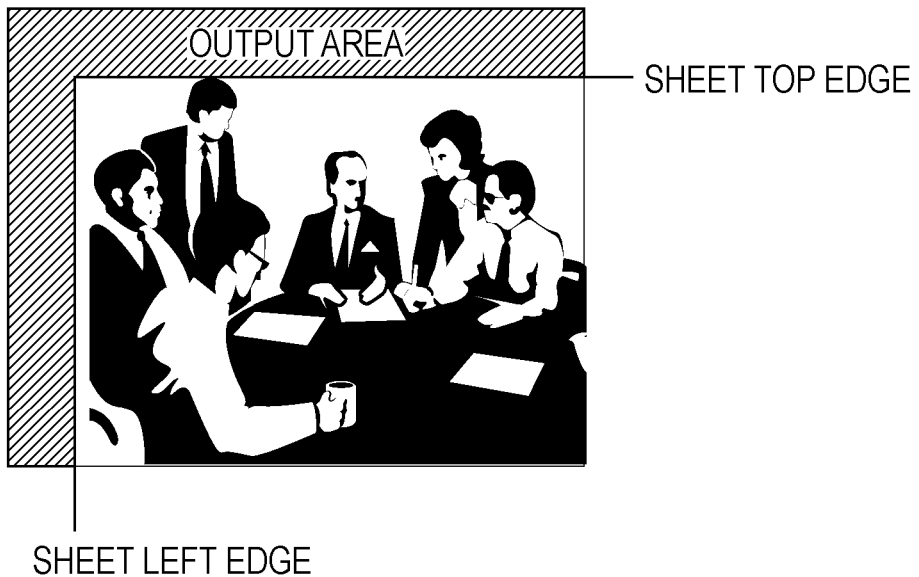
FIG. 14A is a diagram illustrating an example of an <Img> element arranged on an edge of a sheet.
Figure 14B:
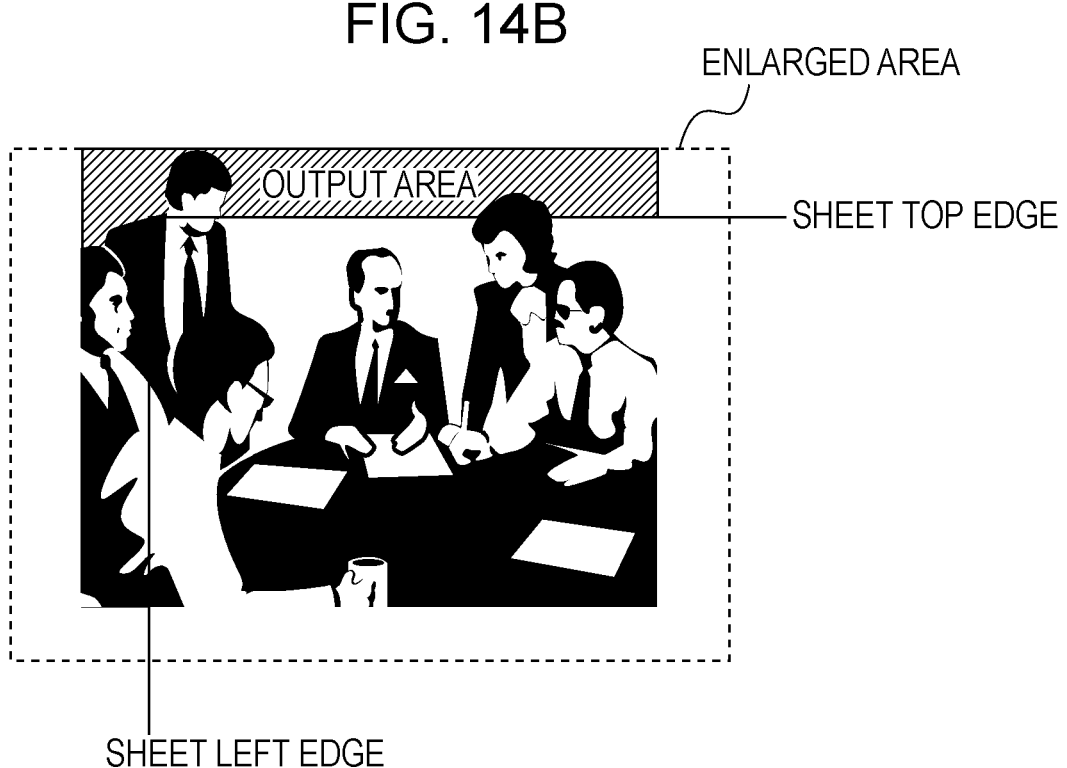
FIG. 14B is a diagram illustrating an example of the manner in which the <Img> element arranged on the edge of the sheet is expanded to the output area.

FIG. 14A is a diagram illustrating an example of an <Img> element arranged on an edge of a sheet. The <Img> element can be designated in the XHTML-Print document. When the <Img> element is designated, the element is an image object shown in, for example, FIG. 14A. The image object can be expanded to the output area by enlarging the image. That is, the image can be enlarged so as to cover the output area, and the thus enlarged image can be cut along the output area. FIG. 14B is a diagram illustrating an example of the manner in which the <Img> element arranged on the edge of the sheet is expanded to the output area. Thus, the image is cut after it is enlarged, so that the edges of the element which are not disposed on the edge of the sheet are not moved from the positions thereof before the image is enlarged. Therefore, the positional relationship between the image and other elements in the page can be maintained.

In the case where a plurality of images are enlarged in the above-described manner, if the magnification differs between the images, the positional relationship between the images will be changed. Therefore, the magnification of the images may be determined after analyzing all of the images in the page. If the magnification is too large and it is expected that the image will be degraded, the magnification can be reduced and compensation data for filling a remaining region in the output area may be generated using an edge portion of the image. The reference position for enlarging each image may be varied in accordance with the position of the image. For example, an image on the left edge of the sheet may be enlarged using a position on the right edge of the image as the reference position. In addition, an image at the top left corner may be enlarged using a bottom right corner of the image as the reference position. In this case, it is not necessary to cut the image. Alternatively, each image can be enlarged using the center of the image as the reference position. In the case where the image is a photograph, an object of interest to the photographer is often at the center of the photograph. Therefore, by enlarging the image using the center thereof as the reference position, the object can be prevented from being displaced from the center or being excluded from the print result as a result of the enlarging process. The above-described process of expanding the image is referred to herein as "image marginless process".

Figure 15A:
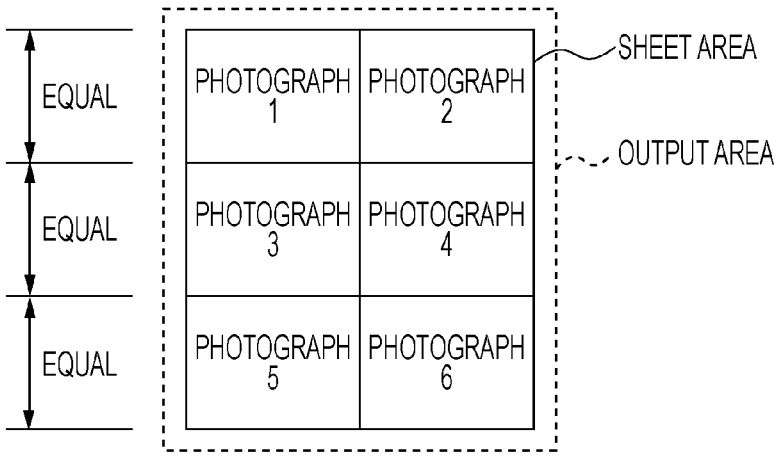
FIG. 15A is a diagram illustrating an example of the result of layout of a document in which six photographs are arranged.
Figure 15B:
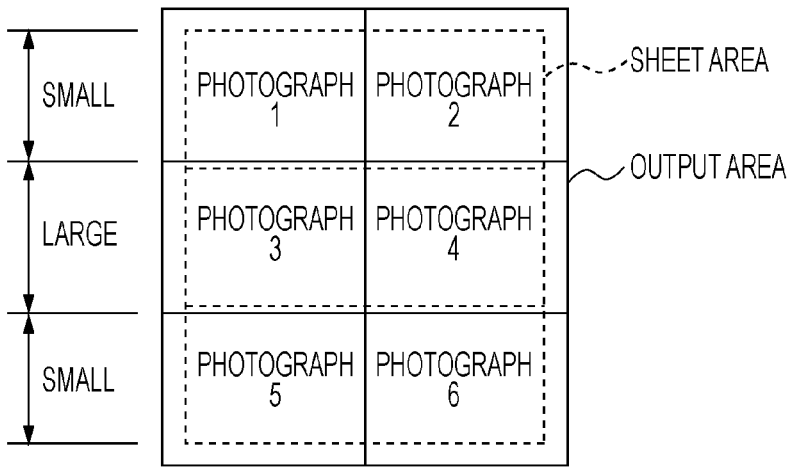
FIG. 15B is a diagram illustrating an example of the manner in which the entire area of the output image shown in FIG. 15A is expanded to a marginless output area.

An example of the image marginless process will now be explained. FIG. 15A is a diagram illustrating an example of the result of layout of a document in which six photographs are arranged. As is clear from FIG. 15A, the six photographs have the same size. FIG. 15B is a diagram illustrating an example of the case where the entire area of the output image shown in FIG. 15A is expanded to a marginless output area. In the case where the entire area of the output image is expanded as shown in FIG. 15B, the areas of the page occupied by the photographs at the center (photographs 3 and 4) are relatively large, whereas the areas of the page occupied by the photographs at the top and bottom (photographs 1, 2, 5, and 6) are relatively small.

Figure 15C:
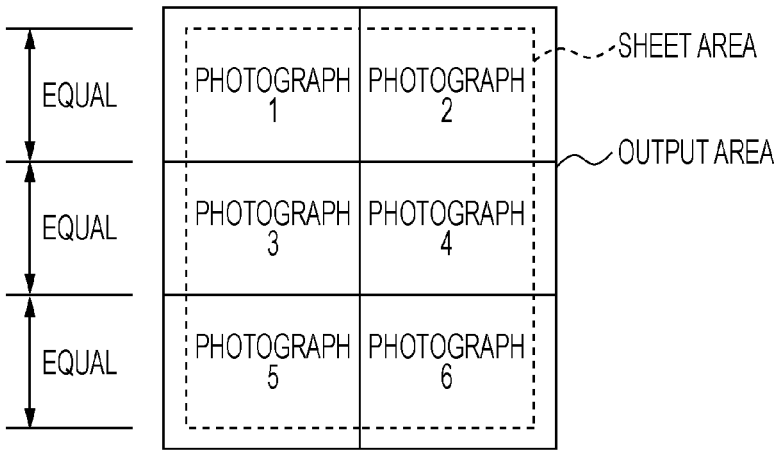
FIG. 15C is a diagram illustrating an example of the manner in which the output image shown in FIG. 15A is expanded to a marginless output area by an "image marginless process".

FIG. 15C is a diagram illustrating an example of the case where the output image shown in FIG. 15A is expanded to a marginless output area by the "image marginless process". According to this method, each of the elements is individually expanded to the output area and is cut. Therefore, the areas of the page occupied by the elements are equal to each other, and the positional relationship between the elements is maintained.

Figure 16:
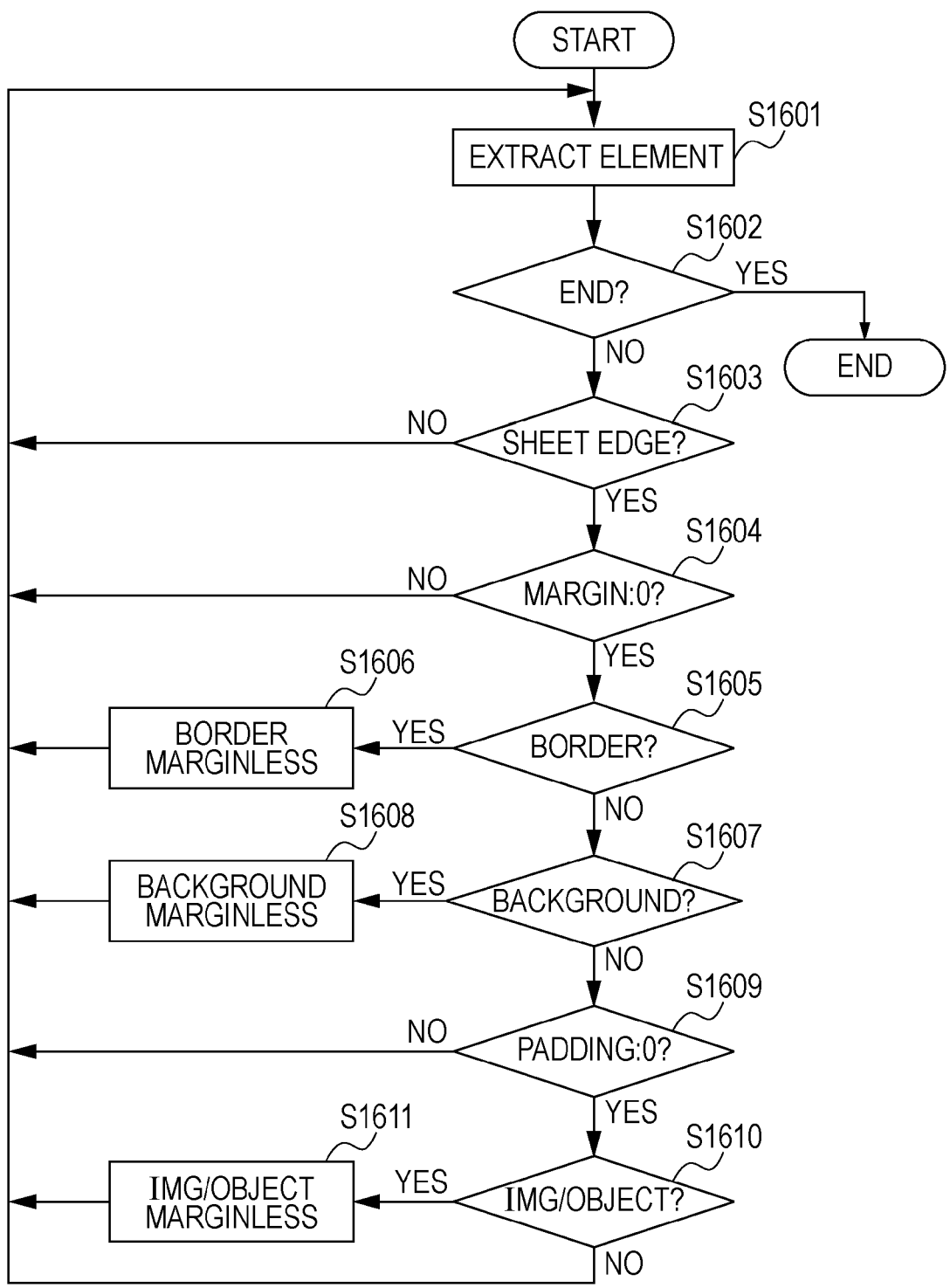
FIG. 16 is a flowchart of a process performed by a marginless correction unit.

FIG. 16 is a flowchart of a process performed by the marginless correction unit 104. In step S1601, an element is extracted from the in-page element tree. In step S1602, it is determined whether or not to end the process depending on whether or not all of the elements are extracted in step S1601. In step S1603, it is determined whether or not the extracted element is disposed on an edge of the sheet. Thus, the elements disposed on the edges of the sheet are detected. If it is determined that the extracted element is not disposed on an edge of the sheet, the process returns to step S1601 and the next element is extracted. In step S1604, it is determined whether or not the margin for the element disposed at an edge of the sheet is 0. Thus, it can be determined whether or not a portion of the element which is to be printed is disposed on an edge of the sheet. In the case where the extracted element is not disposed on an edge of the sheet, the process returns to step S1601.

In step S1605, it is determined whether or not the element has a border. If the element has a border, the process proceeds to step S1606. In step S1606, the above-described border marginless process is performed. If it is determined in step S1605 that the element has no border, the process proceeds to step S1607 and it is determined whether or not a background is designated. If a background is designated, the process proceeds to step S1608 and the above-described background marginless process is performed.

If it is determined in step S1607 that no background is designated, the process proceeds to step S1609 and it is determined whether or not the padding described with reference to FIG. 7 is 0. In this case, no border or background is designated. Therefore, if Padding is 0, it can be determined that the content of the element is disposed on an edge of the sheet. If Padding is not 0, the process returns to step S1601. If Padding is 0, the process proceeds to step 1610. In step S1610, it is determined whether or not the content of the element is <Img> or <Object>. If the content of the element is <Img> or <Object>, the above-described image marginless process is performed. Then, the process returns to step S1601 and the next element is extracted.

When the above-described process is performed for all of the elements in the in-page element tree, the layout of the elements is determined. Then, the printing process unit 106 performs a print control operation so that an image in which the elements are arranged in accordance with the determined layout is output to the printing mechanism 107 and is printed.

In the above-described embodiment, the attribute of each element described in the page description language is determined, and the element is expanded by a method corresponding to the determined attribute. Accordingly, the image can be expanded without changing the positional relationship between the elements. The expansion is performed after determining whether or not an element is placed on an edge of the page and whether or not the margin of the element is 0. Accordingly, the element can be prevented from being unnecessarily expanded even though no portion of the element which is to be printed is disposed on an edge of the page.

In the above-described embodiment, a document described in a page description language is received and processed by a printing apparatus. However, the present invention is not limited to this, and the document may also be, for example, processed by a personal computer (PC) and printed by an external printing apparatus. In such a case, the method for acquiring a document is not limited to the method of receiving the document from an external device. The document may also be created, or be read out from a storage medium. An image in which the elements are arranged by the PC may be subjected to rendering by the PC before being transmitted to the printing apparatus. Alternatively, the image in which the elements are arranged by the PC may be transmitted to the printing apparatus, and then be subjected to rendering by the printing apparatus.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-276980 filed Oct. 28, 2008, which is hereby incorporated by reference herein in its entirety.

What is claimed is:

1. A print control apparatus comprising:
    an acquiring unit configured to acquire a first element and a second element to be printed, the first element and the second element being arranged over an area corresponding to a print medium;
    a determining unit configured to determine an attribute for each of the first element and the second element acquired by the acquiring unit;
    an arranging unit configured to arrange each of the first element and the second element over the area corresponding to the print medium by using an arranging method corresponding individually to each attribute of each of the first element and the second element determined by the determining unit; and
    a print control unit configured to cause a printing apparatus to print each of the first element and the second element arranged over the area by the arranging unit, on the print medium,
    wherein if the first element is determined to have a background by the determining unit, the arranging unit arranges the first element over the area such that a portion of the first element is copied to outside of the area.

2. The print control apparatus according to claim 1, further comprising:
    a specifying unit configured to specify an element arranged over an area corresponding to the print medium from a plurality of elements to be arranged on the area;
    wherein the arranging unit arranges the plurality of elements so as to place the element specified by the specifying unit over the area.

3. The print control apparatus according to claim 2, wherein the acquiring unit further acquires information indicates arranging positions of the plurality of elements, and the arranging unit changes, among the arranging positions, a position of the element specified by the specifying unit such that the element is arranged over the area corresponding to the print medium and does not change a position of the element not specified.

4. The print control apparatus according to claim 1, wherein the acquiring unit further acquires information representing attributes of the element, and the determining unit determines the attribute of each of the first element and the second element on the basis of the information.

5. The print control apparatus according to claim 1, wherein the acquiring unit further acquires information representing a page size, and the arranging unit determines a printing area larger than the page size according to the page size and arranges the first element and the second element to the determined printing area.

6. The print control apparatus according to claim 1, wherein the acquiring unit further acquires margin information representing a margin with respect to the area corresponding to the print medium, and the arranging unit arranges each of the first element and the second element over the area corresponding to the print medium if the page is to be printed without a margin according to the margin information.

7. The print control method apparatus according to claim 1, wherein the acquiring unit acquires a document including the first element and the second element described in a markup language.

8. The print control apparatus according to claim 7, wherein the document is described in XHTML-Print.

9. The print control apparatus according to claim 1, wherein, if the first element is determined to have a border by the determining unit, the arranging unit arranges the first element over the area corresponding to the print medium such that an edge portion of the element is expanded over the area.

10. The print control apparatus according to claim 1, wherein, if the first element is determined to be an image by the determining unit, the arranging unit arranges the first element over the area corresponding to the print medium by enlarging the element.

11. The print control apparatus according to claim 10, wherein the arranging unit enlarges the element of the image and cuts edges of the enlarged element which are not arranged on the edge of the area corresponding to the print medium.

12. A print control method comprising:
acquiring a first element and a second element to be printed, the first element and the second element being arranged over an area corresponding to a print medium;
detecting, an attribute for each of the first element and the second element
arranging each of the first element and the second element over the area corresponding to the print medium by using an arranging method corresponding individually to each attribute of each of the first element and the second element determined; and
causing a printing apparatus to print each of the first element and the second element arranged over the area on the print medium,
wherein if the first element is determined to have a background, the first element is arranged over the area such that a portion of the first element is copied to outside of the area.

13. A non-transitory computer readable recording medium which stores a computer-executable process for causing a computer to execute the print control method according to claim 12.

14. A print control apparatus comprising:
an acquiring unit configured to acquire a plurality of elements to be arranged on an area corresponding to a print medium;
a determining unit configured to determine an attribute of an element among the plurality of elements acquired by the acquiring unit, the element being to be arranged over the area;
an arranging unit configured to arrange the plurality of elements, by arranging the element over the area corresponding to the print medium by using an arranging method corresponding to the element determined by the determining unit; and
a print control unit configured to cause a printing apparatus to print the plurality of elements arranged by the arranging unit, on the print medium,
wherein if the element is determined to have a background by the determining unit, the arranging unit arranges the element over the area such that a portion of the element is copied to outside of the area.

* * * * *